(12) United States Patent
Catchpole et al.

(10) Patent No.: US 9,516,078 B2
(45) Date of Patent: Dec. 6, 2016

(54) SYSTEM AND METHOD FOR PROVIDING INTELLIGENT CHUNK DURATION

(71) Applicant: CISCO TECHNOLOGY, INC., San Jose, CA (US)

(72) Inventors: Jason J. Catchpole, Hamilton (NZ); James N. Littin, Hamilton (NZ)

(73) Assignee: CISCO TECHNOLOGY, INC., San Jose, CA (US)

( * ) Notice: Subject to any disclaimer, the term of this patent is extended or adjusted under 35 U.S.C. 154(b) by 358 days.

(21) Appl. No.: 13/661,330

(22) Filed: Oct. 26, 2012

(65) Prior Publication Data

US 2014/0119428 A1     May 1, 2014

(51) Int. Cl.

| | |
|---|---|
| H04N 7/14 | (2006.01) |
| H04J 3/24 | (2006.01) |
| H04N 9/475 | (2006.01) |
| H04L 29/06 | (2006.01) |
| H04N 21/472 | (2011.01) |
| H04N 21/6587 | (2011.01) |
| H04N 21/845 | (2011.01) |

(52) U.S. Cl.
CPC ......... *H04L 65/4084* (2013.01); *H04L 65/605* (2013.01); *H04L 65/607* (2013.01); *H04N 21/47217* (2013.01); *H04N 21/6587* (2013.01); *H04N 21/8456* (2013.01)

(58) Field of Classification Search
CPC ........ G06F 15/16; G06F 17/00; G06F 17/30; G06F 12/00; G06F 12/16; H04N 5/14; H04L 12/189; H04J 3/24
USPC .................. 348/700; 715/726, 512; 711/115; 709/231
See application file for complete search history.

(56) References Cited

U.S. PATENT DOCUMENTS

| | | | |
|---|---|---|---|
| 5,561,456 | A | 10/1996 | Yu |
| 5,978,357 | A | 11/1999 | Charny |
| 6,052,361 | A | 4/2000 | Ansari et al. |
| 6,091,455 | A | 7/2000 | Yang |
| 6,229,789 | B1 | 5/2001 | Simpson et al. |

(Continued)

FOREIGN PATENT DOCUMENTS

| | | |
|---|---|---|
| CN | 104365074 A | 2/2015 |
| EP | 2530885 | 12/2012 |

(Continued)

OTHER PUBLICATIONS

USPTO May 29, 2014 Notice of Allowance from U.S. Appl. No. 13/494,633.

(Continued)

*Primary Examiner* — Sath V Perungavoor
*Assistant Examiner* — Patricia I Young
(74) *Attorney, Agent, or Firm* — Patent Capital Group

(57) ABSTRACT

A method is provided in one example embodiment and includes receiving analytics information for a video file at a transcoder, the analytics information includes a plurality of points of interest. The method also includes determining a plurality of durations associated with a plurality of chunks of video data associated with the video file, the determining includes identifying a minimal distance between certain times associated with the plurality of points of interest and keyframe times. The method also includes transcoding the video file using the plurality of durations. The video file can be received from an analytics extractor that is to generate the plurality of points of interest.

20 Claims, 4 Drawing Sheets

(56) References Cited

U.S. PATENT DOCUMENTS

| | | |
|---|---|---|
| 6,279,039 B1 | 8/2001 | Bhat |
| 6,377,548 B1 | 4/2002 | Chuah |
| 6,859,496 B1 | 2/2005 | Borocsky |
| 7,027,414 B2 | 4/2006 | Walsh et al. |
| 7,035,435 B2* | 4/2006 | Li et al. ............ 382/107 |
| 7,158,481 B1 | 1/2007 | Saari |
| 7,493,017 B2 | 2/2009 | Adler et al. |
| 7,672,371 B2 | 3/2010 | Gatepin |
| 7,797,633 B2* | 9/2010 | Flick et al. ............ 715/726 |
| 7,826,469 B1 | 11/2010 | Li |
| 8,161,158 B2 | 4/2012 | Curcio et al. |
| 8,351,331 B2 | 1/2013 | Karagiannis |
| 8,396,983 B1 | 3/2013 | Inskip et al. |
| 8,489,704 B1 | 7/2013 | Mendez |
| 8,537,699 B2 | 9/2013 | Leung |
| 9,026,671 B2* | 5/2015 | Gillies ............ H04L 12/1881 370/230 |
| 9,306,994 B2 | 4/2016 | Gahm et al. |
| 2002/0042833 A1* | 4/2002 | Hendler et al. ............ 709/231 |
| 2002/0044528 A1 | 4/2002 | Pogrebinsky et al. |
| 2003/0118208 A1 | 6/2003 | Epstein |
| 2003/0156650 A1 | 8/2003 | Campisano et al. |
| 2003/0200175 A1 | 10/2003 | Wang et al. |
| 2004/0092278 A1 | 5/2004 | Diepstraten |
| 2004/0098748 A1 | 5/2004 | Bo et al. |
| 2004/0246937 A1 | 12/2004 | Duong |
| 2005/0025150 A1 | 2/2005 | Helmy et al. |
| 2005/0047425 A1 | 3/2005 | Liu |
| 2005/0232148 A1 | 10/2005 | Curcio et al. |
| 2006/0039381 A1 | 2/2006 | Anschutz et al. |
| 2006/0143678 A1 | 6/2006 | Chou et al. |
| 2006/0288273 A1* | 12/2006 | Erol et al. ............ 715/512 |
| 2007/0039449 A1 | 2/2007 | Redmann |
| 2007/0053446 A1 | 3/2007 | Spilo |
| 2007/0073904 A1 | 3/2007 | Leung |
| 2007/0165531 A1 | 7/2007 | Labrador et al. |
| 2007/0261082 A1 | 11/2007 | Ji |
| 2008/0046893 A1 | 2/2008 | Taylor |
| 2008/0101410 A1 | 5/2008 | Barkley et al. |
| 2008/0133766 A1 | 6/2008 | Luo |
| 2008/0175273 A1 | 7/2008 | Johansson et al. |
| 2008/0192839 A1 | 8/2008 | Gahm et al. |
| 2008/0259031 A1 | 10/2008 | Yoshino |
| 2008/0285496 A1 | 11/2008 | Fuchs et al. |
| 2008/0310316 A1 | 12/2008 | Oran et al. |
| 2009/0013129 A1* | 1/2009 | Bondurant ............ 711/115 |
| 2009/0019178 A1 | 1/2009 | Melnyk et al. |
| 2009/0028192 A1 | 1/2009 | Rieger |
| 2009/0055580 A1 | 2/2009 | Moscibroda et al. |
| 2009/0190474 A1 | 7/2009 | Gahm et al. |
| 2009/0249421 A1 | 10/2009 | Liu |
| 2010/0053300 A1 | 3/2010 | Einarsson et al. |
| 2010/0169459 A1 | 7/2010 | Biderman |
| 2010/0198979 A1 | 8/2010 | Pickens et al. |
| 2010/0226247 A1 | 9/2010 | Plamondon |
| 2010/0254462 A1 | 10/2010 | Friedrich et al. |
| 2010/0299552 A1 | 11/2010 | Schlack et al. |
| 2011/0002236 A1 | 1/2011 | Chen et al. |
| 2011/0066673 A1 | 3/2011 | Outlaw |
| 2011/0082924 A1 | 4/2011 | Gopalakrishnan |
| 2012/0004960 A1 | 1/2012 | Ma et al. |
| 2012/0140633 A1 | 6/2012 | Stanwood |
| 2012/0173746 A1 | 7/2012 | Salinger et al. |
| 2012/0302343 A1 | 11/2012 | Hurst et al. |
| 2012/0303833 A1 | 11/2012 | Bao et al. |
| 2012/0327779 A1 | 12/2012 | Gell et al. |
| 2013/0007263 A1 | 1/2013 | Sorouchian et al. |
| 2013/0007831 A1 | 1/2013 | Wu |
| 2013/0023281 A1 | 1/2013 | Meredith et al. |
| 2013/0077675 A1 | 3/2013 | Rosen |
| 2013/0097309 A1 | 4/2013 | Ma |
| 2013/0138828 A1 | 5/2013 | Strasman et al. |
| 2013/0227158 A1 | 8/2013 | Miller et al. |
| 2013/0286879 A1 | 10/2013 | ElArabawy |
| 2013/0326024 A1 | 12/2013 | Chen et al. |
| 2014/0056309 A1 | 2/2014 | Singh |
| 2014/0068076 A1 | 3/2014 | Dasher |
| 2014/0161050 A1 | 6/2014 | Grinshpun |
| 2014/0281009 A1 | 9/2014 | Moorthy |

FOREIGN PATENT DOCUMENTS

| | | |
|---|---|---|
| WO | WO2013/188137 | 12/2013 |
| WO | WO2014/116449 | 7/2014 |

OTHER PUBLICATIONS

Astuti, Davide, ""Packet Handling,"" Seminar on Transport of Multimedia Streams in Wireless Internet, Helsinki, Finland, Aug. 29, 2003, 10 pages http://marco.uminho.pt/disciplinas/ST/st0304/packethandling.pdf.

Houdaille, Remi, et al., "Shaping HTTP Adaptive Streams for a Better User Experience," MMSys'12 Proceedings of the 3rd Multimedia Systems Conference, Feb. 22, 2012, ISBN:978-1-45-031131-1, pp. 1-9.

Jiang, Junchen et al., "Improving fairness, efficiency, and stability in HTTP-based adaptive video streaming with FESTIVE," Emerging Networking Experiments and Technologies, Dec. 10, 2012, pp. 97-108.

PCT Apr. 25, 2014 International Search Report and Written Opinion from International Application No. PCT/US2014/0011185.

PCT May 15, 2014 International Search Report and Written Opinion from International Application No. PCT/US2014/0018657.

Tian, Guibin, et al., "Towards Agile and Smooth Video Adaptation in Dynamic HTTP Streaming," Emerging Networking Experiments and Technologies, ACM, Dec. 10, 2012, pp. 109-120.

PCT Sep. 12, 2013 International Search Report and Written Opinion from International Application No. PCT/US2013/043739.

Liu, Chengao, et al., "Rate Adaptation for Adaptive HTTP Streaming," Feb. 23, 2011, XP055077396, Abstract, Section 1 and 2.

Liu, Chenghao, et al., "Rate Adaptation for Dynamic Adaptive Streaming Over HTTP in Content Distribution Network," Signal Processing: Image Communication, vol. 27, No. 4, Oct. 10, 2011, pp. 288-311, XP055070550, ISSN: 0923-5965, DOI: 10.1016/j.image.2011.10.001, Abstract, Sections 1-6, Figure 5.

ISO/IEC 23009-1: Dynamic Adaptive Streaming Over HTTP (DASH)—Part 1: Media presentation description and segment formats, International Standard, Apr. 1, 2012; 134 pages http://standards.iso.org/ittf/license.html.

"Wikipedia, the free encyclopedia, "Adaptive bitrate streaming," [retrieved and printed from the Internet Jan. 25, 2013], 8 pages; http://en.wikipedia.org/w/index.php?title=Adaptive_bitrate_streaming&oldid=534684826".

USPTO Oct. 25, 2013 Non-Final Office Action from U.S. Appl. No. 13/494,633.

U.S. Appl. No. 13/778,350, filed Feb. 27, 2013, entitled "TCP-Based Weighted Fair Video Delivery," Inventors: Mythili Suryanarayana Prabhu, et al.

U.S. Appl. No. 13/750,223, filed Jan. 25, 2013, entitled "System and Method for Robust Adaptation in Adaptive Streaming," Inventors: Zhi Li, et al.

U.S. Appl. No. 13/802,952, filed Mar. 14, 2013, entitled "Scheduler Based Network Virtual Player for Adaptive Bitrate Video Playback," Inventors: Siddhartha Dattagupta, et al.

U.S. Appl. No. 13/967,183, filed Aug. 14, 2013, entitled "Load Based Target Alteration in Streaming Environments," Inventors: Eric Colin Friedrich, et al.

USPTO Sep. 18, 2014 Non-Final Office Action from U.S. Appl. No. 13/552,212.

USPTO May 29, 2014 Final Office Action from U.S. Appl. No. 13/489,786.

USPTO Nov. 3, 2014 Non-Final Office Action from U.S. Appl. No. 13/489,786.

Jiang, Junchen et al., ""Improving fairness, efficiency, and stability in HTTP-based adaptive video streaming,"" Jun. 2012, School of Computer Science, Carnegie Mellon University.

(56) References Cited

OTHER PUBLICATIONS

U.S. Appl. No. 13/489,786, filed Jun. 6, 2012, entitled "Stabilization of Adaptive Streaming Video Clients Through Rate Limiting," Inventors: Joshua B. Gahm, et al.
U.S. Appl. No. 13/494,633, filed Jun. 12, 2012, entitled "System and Method for Preventing Overestimation of Available Bandwidth in Adaptive Bitrate Streaming Clients," Inventors: Joshua B. Gahm, et al.
U.S. Appl. No. 13/552,212, filed Jul. 18, 2012, entitled "System and Method for Providing Randomization in Adaptive Bitrate Streaming Environments," Inventors: Joshua B. Gahm, et al.
Wikipedia®, "Bufferbloat," [retrieved and printed from http://en.wikipedia.org/wiki/Bufferbloat on Jun. 12, 2012], 4 pages.
B.J. Villa, et al., Improving Perceived Fairness and QoE for Adaptive Video Streams, IARIA © 2012, ISBN 978-1-61208-186-1, 10 pages.
Akhshabi, Saamer, et al., "An Experimental Evaluation of Rate-Adaptive Video Players over HTTP," Signal Processing: Image Communication Apr. 1, 2012, ISSN:0923-5965.
Akhshabi, Saamer, et al., "What Happens When HTTP Adaptive Streaming Players Compete for Bandwidth?", May 2, 2012, ISBN:978-1-45-031430-5.
Houdaille, Remi, et al., "Shaping HTTP Adaptive Streams for a Better User Experience," MMSys'12 Proceedings of the 3rd Multimedia Systems Conference, Feb. 22, 2012, ISBN:978-1-45-031131-1, Abstract Only.
USPTO Dec. 19, 2013 Non-Final Office Action from U.S. Appl. No. 13/489,786.
USPTO Jun. 4, 2015 Non-Final Office Action from U.S. Appl. No. 13/552,212.
USPTO Jul. 10, 2015 Final Office Action from U.S. Appl. No. 13/802,952.
"Randomize Definition," Merriam-Webster, May 13, 2015 [legible copy follows beginning on p. 4].
"Random Definition," Merriam-Webster, May 13, 2015 [legible copy follows beginning on p. 6].
PCT Jul. 28, 2015 International Preliminary Report on Patentability and Written Opinion from International Application No. PCT/US2014/011185.
USPTO Jan. 22, 2015 Final Office Action from U.S. Appl. No. 13/552,212.
USPTO Feb. 23, 2015 Non-Final Office Action from U.S. Appl. No. 13/750,223.
USPTO Jan. 13, 2015 Non-Final Office Action from U.S. Appl. No. 13/802,952.
PCT Dec. 16, 2014 International Preliminary Report on Patentability and Written Opinion from the International Searching Authority from International Application No. PCT/US2013/043739.
USPTO Sep. 11, 2015 Final Office Action from U.S. Appl. No. 13/750,223.
USPTO Feb. 25, 2016 Final Office Action from U.S. Appl. No. 13/802,952.
USPTO Sep. 16, 2015 Non-Final Office Action from U.S. Appl. No. 13/967,183.
USPTO Mar. 24, 2016 Final Office Action from U.S. Appl. No. 13/967,183.
USPTO Mar. 28, 2016 Notice of Allowance from U.S. Appl. No. 13/552,212.

\* cited by examiner

SYSTEM AND METHOD FOR PROVIDING INTELLIGENT CHUNK DURATION

TECHNICAL FIELD

This disclosure relates in general to the field of communications and, more particularly, to a system and a method for providing intelligent chunk duration in a streaming environment.

BACKGROUND

End users have more media and communications choices than ever before. A number of prominent technological trends are currently afoot (e.g., more computing devices, more online video services, more Internet video traffic), and these trends are changing the media delivery landscape. Separately, these trends are pushing the limits of capacity and, further, degrading the performance of video, where such degradation creates frustration amongst end users, content providers, and service providers. In many instances, the video data sought for delivery is dropped, fragmented, delayed, or simply unavailable to certain end users.

Many techniques can be used in streaming multimedia over computer networks. While in the past, most video streaming technologies utilized either file download, progressive file download, or custom streaming protocols, most of today's streaming technologies are based on hypertext transfer protocol (HTTP). These technologies are designed to work efficiently over large distributed HTTP networks such as the Internet.

Most streaming technologies operate by detecting a user's bandwidth and central processing unit (CPU) capacity and by adjusting the quality of a video stream accordingly. Typically, the streaming technology can leverage the use of an encoder that can encode a single source video at multiple bitrates. The player client can switch among the different encodings depending on available resources. Ideally, the result of these activities is little buffering, fast start times, and good experiences for both high-bandwidth and low-bandwidth connections. However, certain fixed chunk sizes result in significant inefficiencies. In general terms, download overhead should be minimized, while not sacrificing video quality.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving analytics information for a video file at a transcoder, the analytics information includes a plurality of points of interest (that can be provided in any suitable format). The method also includes determining a plurality of durations associated with a plurality of chunks of video data associated with the video file, where the determining may include identifying a minimal distance between certain times associated with the plurality of points of interest and keyframe times. The method also includes transcoding the video file using the plurality of durations. The video file can be received from an analytics extractor that is to generate the plurality of points of interest.

In more specific embodiments, the method can include identifying a keyframe start time associated with a video file; closing a previous chunk of video data being processed; and inserting a new keyframe to begin processing a next chunk of video data associated with the video file. The plurality of points of interest can be associated with particular points in time of the video file to which a client device would seek.

The method may also include generating a manifest file associated with the video file. The manifest file describes a stream associated with the video file including a number of chunks being streamed and a length associated with each of the number of chunks, and the manifest file is used by a client device to begin playback of the video file. The transcoding can occur in conjunction with bounding chunk duration to a maximum length to preserve random access, which is to allow a client device to seek to a random part of the video file.

EXAMPLE EMBODIMENTS

Figure 1A:
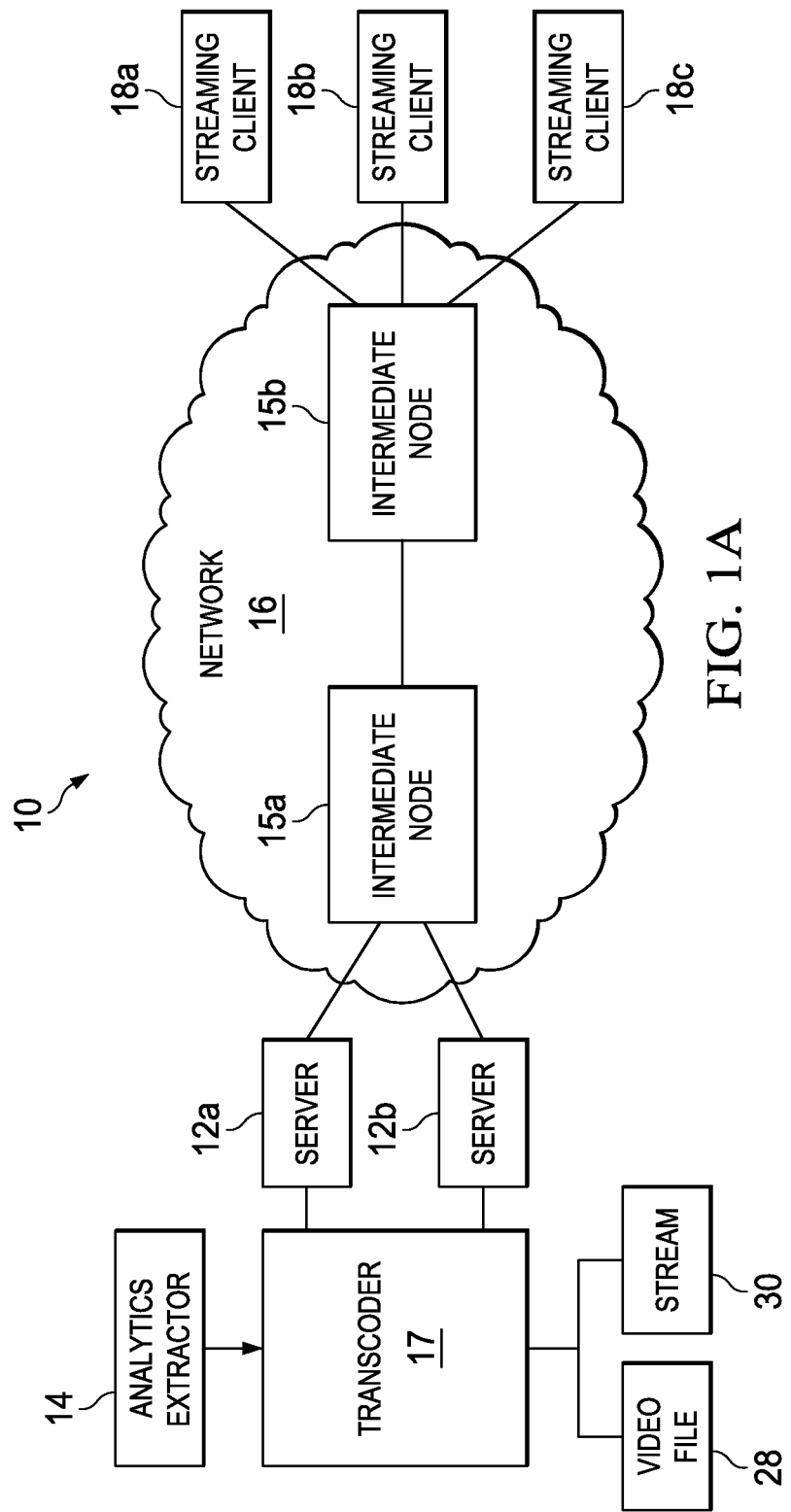
FIG. 1A is a simplified block diagram of a communication system for providing intelligent chunk durations in streaming environments in accordance with one embodiment of the present disclosure.
Figure 1B:
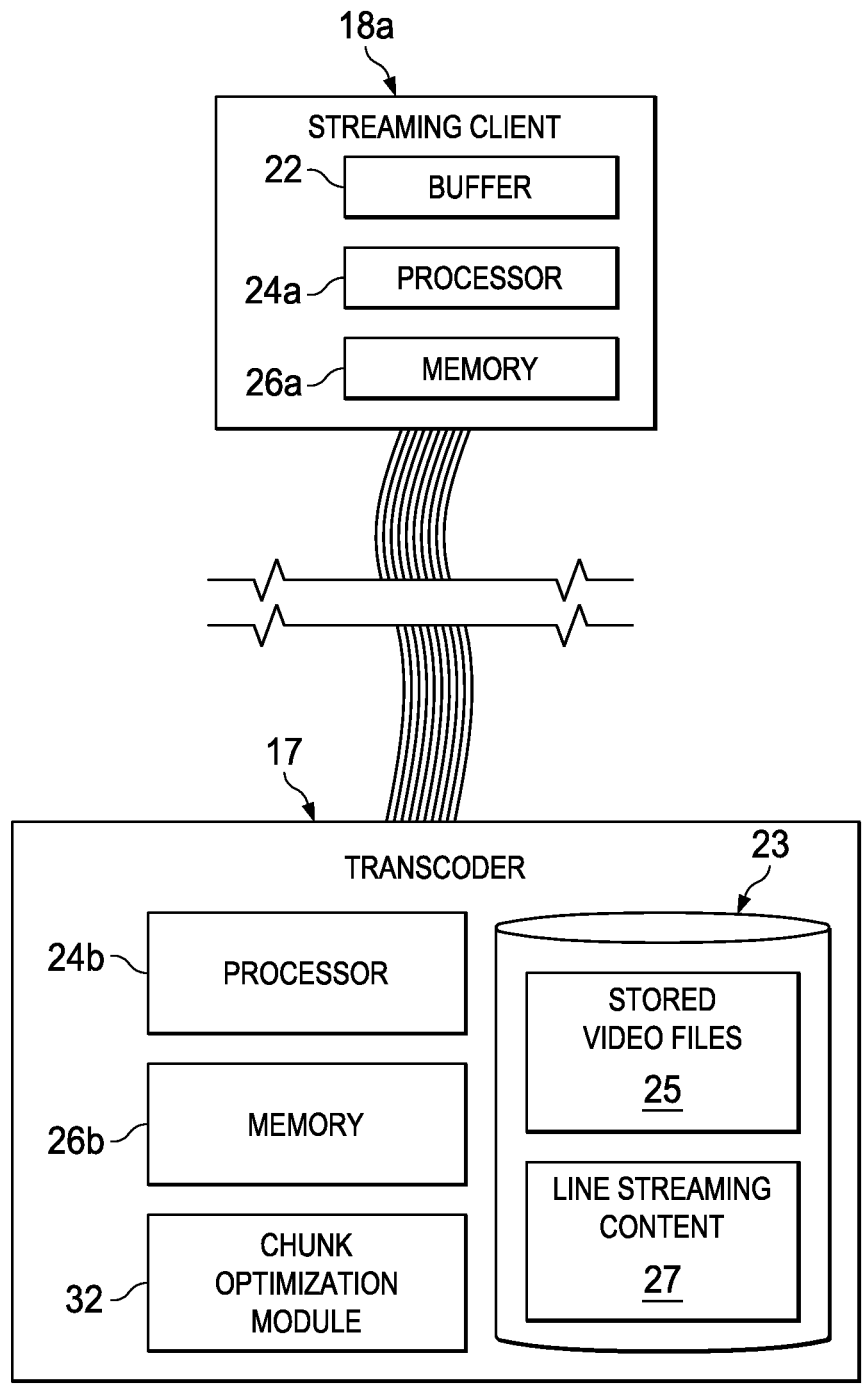
FIG. 1B is a simplified block diagram illustrating possible example details associated with one embodiment of the present disclosure.

Turning to FIG. 1A, FIG. 1A is a simplified block diagram of a communication system 10 configured for providing intelligent chunk durations in streaming environments for a plurality of clients in accordance with one embodiment of the present disclosure. Communication system 10 includes a plurality of servers 12a-b, a network 16, a transcoder 17, a plurality of clients 18a-c, and a plurality of intermediate nodes 15a-b. FIG. 1A also includes an analytics extractor 14, a video file 28, and a stream 30. Servers 12a-b are configured to deliver requested content (e.g., video file 28, stream 30) to clients 18a-c. The content may include any suitable information and/or data that can propagate in the network (e.g., video, audio, media, any type of streaming information, etc.). Certain content may be stored in any appropriate media storage, which can be located anywhere in the network. The storage may be a part of any web server, logically connected to one of servers 12a-b, suitably accessed using network 16, provisioned within transcoder 17 (as depicted in FIG. 1B), etc. In general, communication system 10 can be configured to provide downloading and streaming capabilities associated with various data services (e.g., live broadcasts, OnDemand offerings, etc.). Communication system 10 can also offer the ability to manage content for mixed-media offerings, which may combine video, audio, games, applications, channels, and programs into digital media bundles.

In accordance with the techniques of the present disclosure, the architecture of FIG. 1A can provide a method by which a video can be intelligently segmented into variable duration chunks suitable for hypertext transfer protocol (HTTP) streaming. The architecture can take advantage of knowledge of the interesting points in a video (e.g., provided by analytics extractor 14) to which users are most likely to seek/advance. The efficiency can be maximized by ensuring interesting points occur at (or near) the start of a chunk, while ensuring a reasonably constant network load on the streaming server.

Before detailing these activities in more explicit terms, it is important to understand some of the challenges encountered in a network that includes streaming clients. The following foundational information may be viewed as a basis from which the present disclosure may be properly explained. Adaptive streaming video systems make use of multi-rate video encoding and an elastic IP transport protocol suite (typically hypertext transfer protocol/transmission control protocol/Internet protocol (HTTP/TCP/IP), but could include other transports such as HTTP/SPDY/IP, etc.) to deliver high-quality streaming video to a multitude of simultaneous users under widely varying network conditions. These systems are typically employed for "over-the-top" video services, which accommodate varying quality of service over network paths.

In streaming contexts, the source video is encoded such that the same content is available for streaming at a number of different rates (this can be via either multi-rate coding, such as H.264 AVC, or layered coding, such as H.264 SVC). The video can be divided into "chunks" of a group-of-pictures (GOP) or more (e.g., typically two (2) to ten (10) seconds of length). Clients can access chunks stored on servers (or produced in near real-time for "live" streaming) using a Web paradigm (e.g., HTTP GET operations over a TCP/IP transport), and they depend on the reliability, congestion control, and flow control features of TCP/IP for data delivery. Clients can indirectly observe the performance of the streaming fetch operations by monitoring the delivery rate and/or the fill level of their buffers and, further, either upshift to a higher encoding rate to obtain better quality when bandwidth is available, or downshift in order to avoid buffer under-runs and the consequent video stalls when available bandwidth decreases, or stay at the same rate if available bandwidth does not change. Compared to inelastic systems such as classic cable TV or broadcast services, streaming systems use significantly larger amounts of buffering to absorb the effects of varying bandwidth from the network.

In a typical scenario, streaming clients would fetch content from a network server in segments. Each segment can contain a portion of a program, typically comprising a few seconds of program content. [Note that the term 'segment' and 'chunk' are used interchangeably herein in this disclosure. These terms represent any suitable block of data associated with a video file.] For each portion of the program, there are different segments available with higher and lower encoding bitrates: segments at the higher encoding rates require more storage and more transmission bandwidth than the segments at the lower encoding rates. Clients adapt to changing network conditions by selecting higher or lower encoding rates for each segment requested, requesting segments from the higher encoding rates when more network bandwidth is available (and/or the client buffer is close to full), and requesting segments from the lower encoding rates when less network bandwidth is available (and/or the client buffer is close to empty).

With most technologies, it is common practice to have every segment represent the same, or very nearly the same, interval of program time. For example, in the case of Microsoft Smooth streaming, it is common practice to have every segment (referred to in Smooth as a 'fragment') of a program represent almost exactly 2 seconds worth of content for the program. With Apple HTTP Live Streaming (HLS), it is quite common practice to have every segment of a program represent almost exactly 10 seconds worth of content. Although it is also possible to encode segments with different durations (e.g., using 6-second segments for Apple HLS instead of 10-second segments), even when this is done, it is nevertheless common practice to keep all segments within a program to the same duration. Hence, even if an Apple HLS program were encoding with 6-second segments, rather than 10-second segments, one would normally find all segments from that program having almost exactly a 6-second duration instead of, for example, certain segments representing a 4-second duration, and others representing a 7-second duration within the same program.

When generating a video that is suitable for streaming over HTTP, the video should be encoded in such a way that keyframes (e.g., I-frames) occur periodically (e.g., approximately every 4 seconds). Subsequently, when streaming occurs, the video can be segmented into independent chunks: each beginning with a keyframe. These small chunks can be requested by a client player (over HTTP), which can then decode the video in any particular chunk (since it begins with a keyframe) and play it out. This occurs without having to download and decode all the chunks from the start of the stream.

The problem with this approach is that it can be inefficient. For instance, imagine a user has used the player to seek to 7.5 seconds into the video, as something happened in the video that was interesting at that point. If the streaming server is using 4-second chunks, the second chunk would be requested, the streaming server would generate the chunk, the entire chunk would be transferred, and then the player would decode all the video in that 4-second chunk (3.5 seconds worth) just to play out 500 milliseconds of video. Then, the user's player would have to request the third chunk in order to continue playback.

This fixed chunk size results in significant inefficiencies. If the streaming server (or whatever device produced the streaming capable media) knew there was something interesting at 7.5 seconds into the video, it could have made the second chunk 3.5 seconds long, and the third chunk could have started at time 7.5 seconds.

Shorter chunks would result in less wasted bandwidth because any point of interest in the stream would fall closer to a keyframe. However, keyframes themselves consume more bandwidth than other frames and, the more often they appear, the less bandwidth that is available to encode the remaining frames. All of this results in a lower overall video quality for the stream. In addition, shorter chunks result in more individual requests for media from the player to the streaming server (meaning, more bandwidth is consumed playing the stream). Hence, a balance should be maintained with the frequency of keyframes such that video quality and chunk duration is maximized. Additionally, the overheads of downloading all the chunks from a streaming server are minimized.

Various HTTP streaming solutions typically describe desirable qualities of a stream, such as minimum and maximum chunk durations and a positioning of keyframes within the chunks. They assume the video encoder to be independent of the streaming server chunking mechanism, so the requirements they make of it are necessarily simple.

Typical approaches of HTTP streaming solutions require that each chunk's duration is fixed at one (or more) "group of pictures" (GOPs). Further, some solutions allow random access into the stream only at the start of chunks, or make no particular requirements on the duration of the chunks and allow access at specified points within the chunks. The first approach is used by Microsoft Smooth Streaming and recommended for Apple's HTTP Live Streaming. This can be readily implemented by driving chunk creation off the keyframe placement. A second approach is that of Adobe's HTTP Dynamic Streaming, and this approach allows factors such as file size to drive chunk duration without requiring regular keyframes, which may benefit the video encoder in hitting a specific bitrate or meeting quality targets. However, any media in a chunk (prior to the random access point in the chunk) is wasted bandwidth because it is downloaded and not decoded or played out. In its most simple implementation, the second approach is equivalent to the first (i.e., the chunk has a single random access point specified, and it happens to be at the start of the chunk).

In addition to the vender-centric versions of HTTP streaming mentioned above, the Moving Picture Experts Group (MPEG) developed an international standard for HTTP streaming called Dynamic Adaptive Streaming over HTTP (DASH). DASH allows more than one keyframe in a given chunk and, further, also allows byte-range requests so that subsegments of a chunk can be downloaded without having to request the entire chunk.

The first approach places emphasis for chunking the media on the encoder because chunks are effectively defined in which the encoder inserts keyframes in the stream. The second approach places the emphasis for chunking the media on the streaming server's chunking mechanism, where the effects of the encoder on the chunked media (e.g., such as keyframe placement) are of secondary importance.

In the approaches listed above, encoding and chunking behaviors are independent of the media being streamed, and settings to suit one approach may not be as suitable for the other. The encoder and the chunker typically do not have any knowledge of which points in the video are 'interesting'; they are simply configured with fixed settings that are guessed to suit all media.

Communication system 10 can address these issues (as well as potentially others) by intelligently segmenting video into variable duration chunks suitable for HTTP streaming. By leveraging analytics extractor 14, the architecture can understand the interesting points in a video. If the architecture knew which points in the video were 'interesting', then it could optimize the duration of each chunk (or, stated in different terms, the spacing between keyframes) such that keyframes occur at these interesting points in the video. Indeed, one aspect of this disclosure involves recognizing certain interesting points exist and are more likely to be seek points in the video. The system as a whole can be made more efficient by exploiting this knowledge when choosing chunk durations. In addition, a method is presented by which this information can be used to minimize the inefficiencies, while maximizing video quality.

In a first aspect of the present disclosure, points in the video that a user would be most likely to seek to can be identified. Analytics of any kind can be used to identify certain times as being interesting (i.e., a new slide was shown in a video, a new person started speaking in a video, an interesting keyword was uttered in a video, etc.). In a second aspect of the present disclosure, points where something interesting occurs in the video and that might benefit from a new keyframe being added (e.g., scene changes) are identified.

For example, certain interesting points in the video can be identified by various data collection engines (e.g., the Pulse Analytics Product manufactured by Cisco Systems, Inc. of San Jose, Calif.). These interesting points can be available and used when transcoding a streaming media file. Furthermore, these analytics (e.g., keywords, speaker changes, slide changes, scene changes) can be exposed to the users, who are playing back videos via any number of pathways (e.g., sharing portals, Show-n-Share paradigms, etc.). This allows them to jump to parts of the video that are identified as being interesting in some way and, thus, the likelihood that users will be seeking to these interesting points in the video is high. This further increases the significance of efficiently segmenting the media into chunks that makes the best use of the computational resources that both generate (i.e., a server) and consume (i.e., a client) this data.

Before turning to the example flows of the present disclosure, a brief overview of the internal structure of an example client and an example transcoder is provided via FIG. 1B. Turning to FIG. 1B, FIG. 1B is a simplified block diagram illustrating one possible set of details associated with communication system 10. This particular configuration includes client 18a being provisioned with a buffer 22, a processor 24a, and a memory 26a. Buffer 22 can be configured to buffer content received at a receiver (e.g., client 18a). Transcoder 17 may include a processor 24b, a memory 26b, a chunk optimization module 32, and a storage element for stored video files 23, along with a storage element for live streaming content 27.

Figure 2:
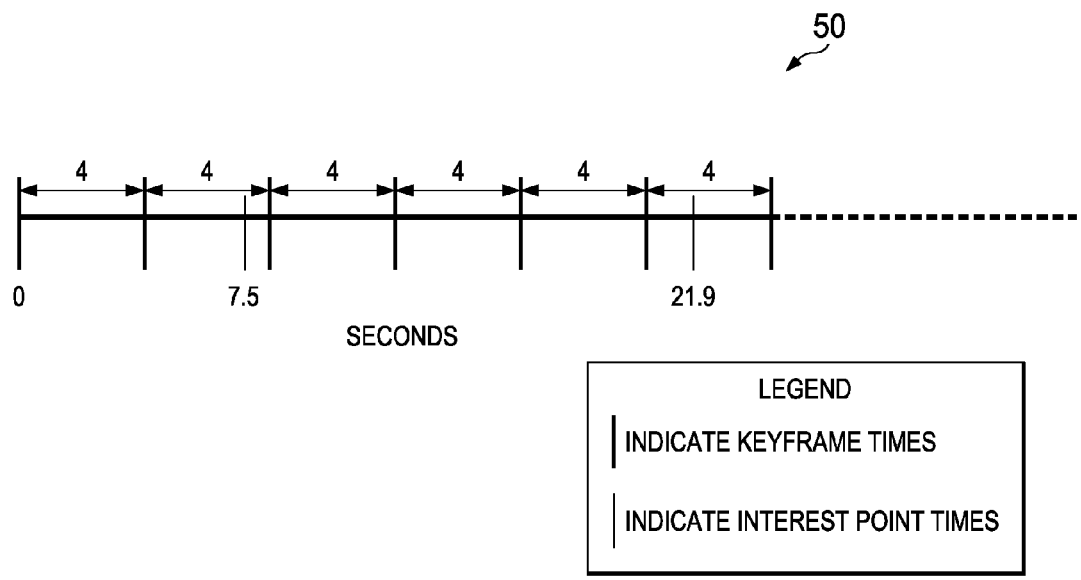
FIG. 2 is a simplified timing diagram illustrating operations associated with streaming data in a network environment.

Turning to FIG. 2, FIG. 2 is a simplified timing diagram generally indicated at 50 and illustrating certain approaches to keyframe insertion. In this particular example, keyframes are inserted periodically (e.g., every 4 seconds, represented by one set of vertical bars). FIG. 2 also illustrates the location of various interest points (represented by different vertical bars). Keyframes are being inserted without any knowledge of (or regard to) interest points and this creates a glaring inefficiency.

Figure 3:
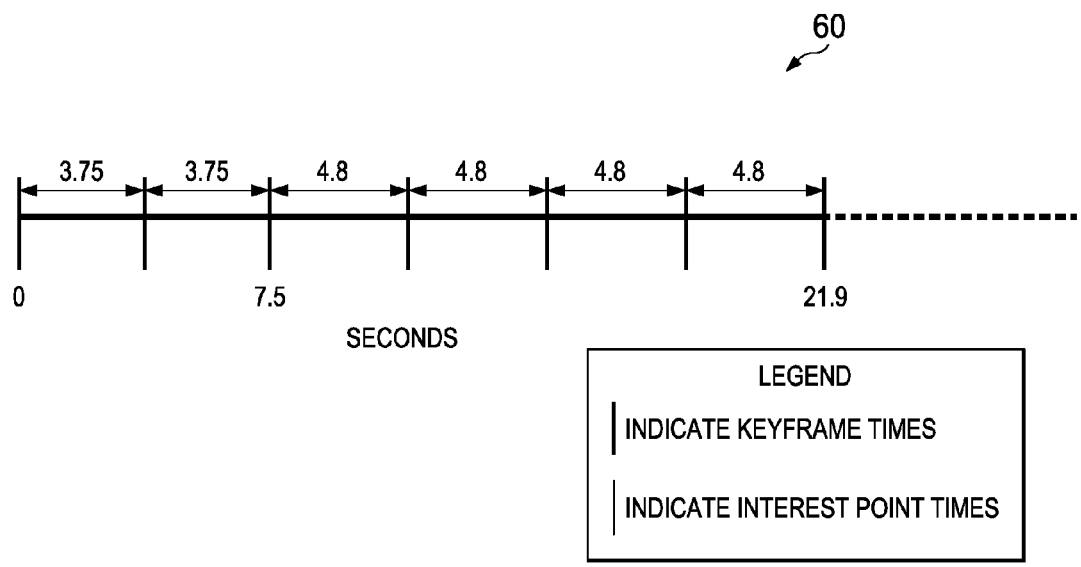
FIG. 3 is another simplified timing diagram illustrating potential operations associated with the communication system in accordance with one embodiment of the present disclosure.

FIG. 3 is a simplified timing diagram generally indicated at 60 and illustrating optimal spacing of keyframes in accordance with the teachings of the present disclosure. The first two chunk durations are both set to 3.75 seconds such that the interest point at time 7.5 seconds now occurs at the start of the third chunk. Additionally, the third, fourth, and fifth chunks have now been set to 4.8 seconds in length such that the key point at 21.9 seconds coincides with the start of the sixth chunk. These selected durations are simply one example configuration for this scenario. After the 7.5 second interest point, we could have equally selected to insert four 3.6 second long chunks, rather than three 4.8 second chunks. Longer chunks could be used, for instance, if there were a significant amount of motion detected during this time period. Alternatively, there could be a global (e.g., predefined) policy to prefer a larger number of shorter chunks, or fewer longer chunks in ambiguous situations.

In operation, communication system 10 is configured to minimize the difference between the time at which an interest point occurs and when a keyframe is inserted over all interesting points and keyframes in the video. In seeking this optimal solution, the platform can also consider the following constraints:

1) Duration of each chunk (minimum keyframe spacing) should be greater than some minimum (termed Dmin) and less than some maximum (Dmax); and 2) Ensure an interest point is, at best, precisely at a keyframe and, at worse, is some small amount of time after a keyframe. The scenario to avoid is having an interest point slightly before a keyframe, as that is where the inefficiency arises.

If given a set of n interest points detected in the video $$I=\{I_1, I_2, \ldots, I_n\}$$

and $$K=\{K_1, K_2, \ldots, K_m\}$$

is the set of m keyframe times sought to be determined, where m≥n.

The objective is to minimize the following $$\min_{K_j} \sum_{i}^{n} I_i - K_j$$

where $I_i - K_j \geq 0$. Additionally, it should be ensured that $$\forall i: D_{max} \geq K_{j+1} - K_j \geq D_{min}.$$

Determining the values of all keyframe times in K that minimize the above relationship could be solved using a number of techniques and this represents a typical problem to solve using various mathematical optimization techniques. It should be noted that this disclosure does not limit itself to any one approach for finding the values of K that minimizes this relationship.

In terms of advantages, by placing keyframes at these interesting points, the architecture can increase the efficiency of the system as a whole in several respects. First, it can reduce the load on the streaming server. For example, consider the example that was presented previously, where there is an interest point at time 7.5 seconds and the user seeks to this position in the video and plays 4 seconds of video. When the architecture generates a chunk, it is desirable to maximize its utility for the server's benefit (as well as the client's benefit, as discussed below). This can be done by ensuring that when a chunk is provided, the player will play out the whole chunk (instead of only 500 milliseconds of it, as in the previous example). This would reduce the number of chunks the user would request from the server and, consequently, reduce the load in terms of network bandwidth transferring chunks, and the computational load from actually generating the chunks. In the context of the referenced example, it is not desirable for the system to generate chunk 2, only to have chunk 3 requested moments later (because only 500 milliseconds of chunk 2 was sought). The architecture should generate a chunk that begins at 7.5 seconds, where the client plays out the entirety of this chunk.

Another potential advantage that can be provided by communication system 10 is the reduction of load on the client device (e.g., a personal computer or mobile device that is actually performing the playback). Continuing with the previous example, with an interest point at time 7.5 seconds where the user seeks to this position in the video, then by starting the 3rd chunk at this time, the system saves the user downloading 3.5 seconds worth of video that they would not even play if the system had naively spaced the keyframes 4 seconds apart (thereby, decreasing network load). There is also a savings for the user's client device from having to decode those 3.5 seconds worth of video (from the keyframe up to the interest point) in order to be able to begin playback from this point.

Yet another potential advantage that may be provided by communication system 10 is the improvement in the efficiency of the encoding process. For example, if the architecture is systematically going to be inserting a keyframe into the video stream anyway (to make HTTP streaming possible), then it should also insert the keyframe at a point in the video where there is a scene change (e.g., if one exists within close proximity to a point where the system will be inserting a keyframe anyway). In this manner, subsequent frames that are encoded in the chunk would be more similar to this keyframe, thereby, making these frames easier to compress (resulting in higher-quality video for the same fixed bitrate). If the architecture inserts a keyframe before the new scene comes into effect, then the frame at which the scene change occurs, and all subsequent frames in the chunk, would see a reduction in video quality to hit the desired bitrate.

In general terms, one approach being outlined herein allows the system to obtain an optimal balance between video quality and wasted bandwidth by tailoring chunk durations for a given stream. It enables the system to maximize chunk length and, thus, video quality, while minimizing wasted bandwidth by ensuring likely interest points occur at (or shortly after) keyframes. This all occurs while preserving random access (where a user seeks to a random part of the video) by bounding chunk duration to a maximum length.

Figure 4:
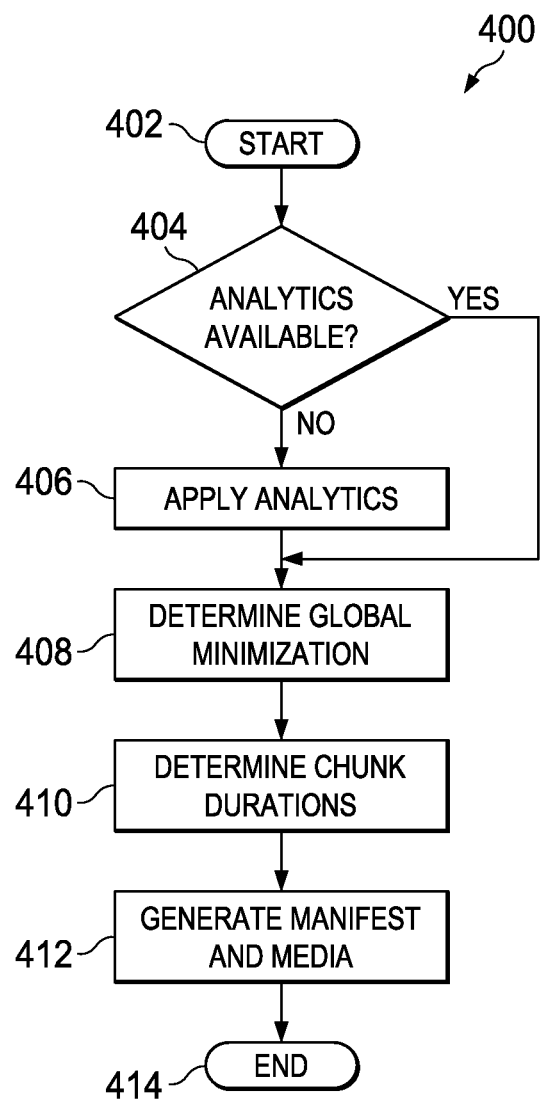
FIG. 4 is a simplified flowchart illustrating an example set of operations associated with the communication system.

Turning to an example flow 400 being illustrated by FIG. 4, this particular flow may begin at 402, where components in the architecture are functional and ready to begin streaming video. At 404, an evaluation is made as to whether analytics are available for a particular video file. The analytics can be provided by any suitable repository, database, third party storage, etc., or provided by various network elements that are configured to capture information in the network and suitably organize or categorize the information, or alternatively analytics information can be extracted from the video by a server. For example, certain gateway devices, firewall equipment, routing and switching components can systematically capture network data, where this information can be suitably processed in order to determine its contents, the participants involved in the video file, key words within the video file, scene changes in the video file, etc.

Hence, communication system 10 can use various analytic tools for evaluating text/video/audio data in order to generate attributes to be used for identifying points of interest for video files. For example, these analytic tools can be used to identify keywords, characteristics, etc. for a particular data file such that a video file is tagged or characterized in any appropriate fashion. As used herein in this Specification, the broad term 'analytics information' is inclusive of any characteristic associated with a data file such as its formatting, underlying protocol, encryption, content (e.g., inclusive of keywords, scene information, participants involved in the video file, business segments/characterizations associated with the file, audio content, video content, other types of media content, etc.), file type, syntax, a sender or receiver of the data file, user information (e.g., which make key off of a user profile), a rating for the data file, a tag of the data file, a digital signature of the data file, a timeframe associated with the data files' creation, transmission, editing, reception, finalization, etc., or any other suitable parameter that may be of interest to users, or the system in evaluating data files.

Returning to the flow of FIG. 4, at 406 the analytics can be applied for a particular video file. At 408, a global minimization strategy can be determined (e.g., this can involve conferring with a policy that may be provisioned in any suitable location and that is based on any number of user preferences, administrator settings, bandwidth issues, video quality issues, transcoding rate limitations, etc.). At 410, the chunk durations can be determined. At 412, a manifest is generated along with media. This information can then be sent to any appropriate next destination (e.g., another component for formatting, a transmission interface for communicating this information, another network element in the network, etc.).

Turning to the example infrastructure associated with the present disclosure, clients 18*a-c* can be associated with devices, customers, or end users wishing to receive data or content in communication system 10 via some network. The term 'client device' is inclusive of devices used to initiate a communication, such as any type of receiver, a computer of any kind, a laptop, a notebook, a set-top box, an Internet radio device (IRD), a cell phone, a smart phone, a tablet, a personal digital assistant (PDA), a Google Droid, an iPhone, and iPad, or any other device, component, element, endpoint, or object capable of initiating voice, audio, video, media, or data exchanges within communication system 10. Clients 18*a-c* may also be inclusive of a suitable interface to the human user, such as a display, a keyboard, a touchpad, a remote control, or any other terminal equipment. Clients 18*a-c* may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, audio, or script data, or any type of source or object code, or any other suitable information in any appropriate format that may be communicated from one point to another.

Transcoder 17 is a network element configured for performing one or more duration optimization operations discussed herein. For example, transcoder 17 can be configured to perform direct digital-to-digital data conversion of one encoding to another (e.g., such as for movie data files or audio files). This is typically done in cases where a target device (or workflow) does not support the format, or has a limited storage capacity that requires a reduced file size. In other cases, transcoder 17 is configured to convert incompatible or obsolete data to a better-supported or more modern format.

Network 16 represents a series of points or nodes of interconnected communication paths for receiving and transmitting packets of information that propagate through communication system 10. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber-to-the-x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

In more general terms, clients 18*a-c*, transcoder 17, and servers 12*a-b* are network elements that can facilitate the chunk duration optimization discussed herein. As used herein in this Specification, the term 'network element' is meant to encompass any of the aforementioned elements, as well as routers, switches, cable boxes, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, transcoder 17 and/or servers 12*a-b* include software to achieve (or to foster) the duration optimization activities discussed herein. This could include the implementation of instances of chunk optimization module 32. Additionally, each of these elements can have an internal structure (e.g., a processor, a memory element, etc.) to facilitate some of the operations described herein. In other embodiments, these chunk duration optimization may be executed externally to these elements, or included in some other network element to achieve the intended functionality. Alternatively, clients 18*a-c*, transcoder 17, and servers 12*a-b* may include software (or reciprocating software) that can coordinate with other network elements in order to achieve the chunk duration optimization described herein. In still other embodiments, one or several devices may include any suitable algorithms, hardware, software, components, modules, interfaces, or objects that facilitate the operations thereof.

As used herein, the term 'duration' can include any suitable timing parameter associated with retrieving content (or, at least portions thereof). In one example, the duration is being optimized based on points of interest. In other scenarios, the duration can be performed dynamically (e.g., in real-time), which may or may not involve points of interest, or feedback associated with a particular time interval.

As identified previously, a network element can include software (e.g., chunk optimization module 32, etc.) to achieve the optimization operations, as outlined herein in this document. In certain example implementations, the chunk duration optimization functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors 24*a* and 24*b* shown in FIG. 1B], or other similar machine, etc.). In some of these instances, a memory element [memory 26*a* and 26*b* shown in FIG. 1B] can store data used for the operations described herein. This includes the memory element being able to store instructions (e.g., software, code, etc.) that are executed to carry out the activities described in this Specification. The processor (e.g., processors 24*a* and 24*b*) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the chunk duration optimization, as outlined herein. Additionally, each of these devices may include a processor that can execute software or an algorithm to perform the chunk duration optimization as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that while the preceding descriptions have addressed smooth-like segment sizes, the present disclosure could equally be applicable to other technologies. For example, Dynamic Adaptive Streaming over HTTP (DASH) is a multimedia streaming technology that could benefit from the techniques of the present disclosure. DASH is an adaptive bitrate streaming technology, where a multimedia file is partitioned into one or more segments and delivered to a client using HTTP. A media presentation description (MPD) can be used to describe segment information (e.g., timing, URL, media characteristics such as video resolution and bitrates). Segments can contain any media data and could be rather large. DASH is audio/video codec agnostic. One or more representations (i.e., versions at different resolutions or bitrates) of multimedia files are typically available, and selection can be made based on network conditions, device capabilities, and user preferences to effectively enable bitrate streaming. In these cases, communication system 10 could perform optimization based on the individual client needs. On another note, in DASH, a client can ask for a byte range (i.e., rather than the whole segment, it can ask for a subsegment (e.g., the first two GOPs inside that segment)). Stated in different terminology, clients have flexibility in terms of what they ask for (i.e., how much data). If the size of each (byte-range) request is varied on the client side by modifying the client behavior, the same optimization effect can be achieved.

In an alternative implementation, communication system 10 can include any number of caches, web proxies, and/or a content delivery networks (CDN) being provisioned in the middle (or at the edge) of a network. The transcoder or the client itself can be embedded in any of these elements (cache, web proxy, CDN). In certain embodiments, any of these elements can be instructed to provide the optimization features discussed herein. Hence, suitable chunk duration optimization functions could be embedded in any of part of the network.

In operation, the CDN can provide chunk optimization of content to clients 18a-c or other endpoints, including set-top boxes, personal computers, game consoles, smartphones, tablet devices, iPads, iPhones, Google Droids, customer premises equipment, or any other suitable endpoint. Note that servers 12a-b (previously identified in FIG. 1A) may also be integrated with or coupled to an edge cache, gateway, CDN, or any other network element. In certain embodiments, servers 12a-b may be integrated with customer premises equipment (CPE), such as a residential gateway (RG). Content chunks may also be cached on an upstream server or cached closer to the edge of the CDN. For example, an origin server may be primed with content chunks, and a residential gateway may also fetch and cache the content chunks.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its techniques) are readily scalable and, further, can accommodate a large number of components, as well as more complicated/sophisticated arrangements and configurations. Accordingly, the examples provided should not limit the scope or inhibit the broad techniques of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Note that the teachings of the present disclosure can readily be implemented in conjunction with any number of video discovery concepts. For example, the present disclosure may be implemented in conjunction with Show-n-Share paradigms, video tracking models, etc. One such example video harvesting paradigm is reflected by U.S. application Ser. No. 13/160,701 (filed Jun. 15, 2011 and entitled: System and Method for Discovering Videos in a Network Environment), which is hereby incorporated by reference in its entirety into this Specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving analytics information for a video file at a transcoder, wherein the analytics information includes a point of interest associated with a time at which the point of interest takes place within the video file;
determining a duration of each of a plurality of consecutive chunks of the video file, wherein at least two of the plurality of consecutive chunks have a different duration;
inserting an I-frame into the video file before the point of interest to divide the at least two of the plurality of consecutive chunks for hypertext transfer protocol (HTTP) streaming, wherein if a set of interest points detected in the video file is $$I=\{I_1,I_2,\ldots,I_n\},$$

then $$K=\{K_1,K_2,\ldots,K_m\}$$

is a set of I-frame times determined to minimize $$\min_{K_j} \sum_{i}^{n} I_i - K_j$$

where $m \geq n$, $I_i - K_j \geq 0$, and, for all i, $D_{max} \geq K_{j+1} - K_j \geq D_{min}$, $D_{max}$ a maximum chunk duration, $D_{min}$ a minimum chunk duration; and
transcoding the video file using the plurality of consecutive chunks.

2. The method of claim 1, wherein the video file is received from an analytics extractor that generates the point of interest.

3. The method of claim 1, wherein the time is associated with a new individual speaking during the video file.

4. The method of claim 1, wherein the time is associated with a scene change associated with the video file.

5. The method of claim 1, further comprising:
generating a manifest file associated with the video file, wherein the manifest file includes times associated with the point of interest and a plurality of keyframes.

6. The method of claim 5, wherein the manifest file describes a stream associated with the video file including a number of chunks for being streamed and a length associated with each of the number of chunks.

7. The method of claim 1, wherein the transcoding occurs in conjunction with bounding a chunk duration to a maximum length.

8. Logic encoded in one or more non-transitory tangible media that includes code for execution and, when executed by a processor, operable to perform operations comprising:
receiving analytics information for a video file at a transcoder, wherein the analytics information includes point of interest associated with a time at which the point of interest takes place within the video file;
determining a duration of each of a plurality of consecutive chunks of the video file, wherein at least two of the plurality of consecutive chunks have a different duration;
inserting an I-frame before the point of interest to divide the at least two of the plurality of consecutive chunks for hypertext transfer protocol (HTTP) streaming, wherein if a set of interest points detected in the video file is $$I=\{I_1,I_2,\ldots,I_n\}$$

then $$K=\{K_1,K_2,\ldots,K_m\}$$

is a set of I-frame times determined to minimize $$\min_{K_j} \sum_{i}^{n} I_i - K_j$$

where $m \geq n$, $I_i - K_j \geq 0$, and, for all i, $D_{max} \geq K_{j+1} - K_j \geq D_{min}$, $D_{max}$ a maximum chunk duration, $D_{min}$ being a minimum chunk duration; and
transcoding the video file using the plurality of consecutive chunks.

9. The logic of claim 8, wherein the video file is received from an analytics extractor that generates the point of interest.

10. The logic of claim 8, wherein the time is associated with a new individual speaking during the video file.

11. The logic of claim 8, wherein the time is associated with a scene change associated with the video file.

12. The logic of claim 8, the operations further comprising:
generating a manifest file associated with the video file, wherein the manifest file includes times associated with the point of interest and a plurality of keyframes.

13. An apparatus, comprising:
a memory element configured to store data;
a processor operable to execute instructions associated with the data; and
a chunk optimization module operable to interface with the memory element and the processor such that the apparatus is configured to
receive analytics information for a video file at a transcoder, wherein the analytics information includes a point of interest associated with a time at which the point of interest takes place within the video file;
determine a duration of each of a plurality of consecutive chunks of the video file, wherein at least two of the plurality of consecutive chunks have a different duration;
insert an I-frame before the point of interest to divide the at least two of the plurality of consecutive chunks for hypertext transfer protocol (HTTP) streaming, wherein if a set of interest points detected in the video file is $$I=\{I_1, I_2, \ldots, I_n\},$$

then $$K=\{K_1, K_2, \ldots, K_m\}$$

is a set of I-frame times determined to minimize $$\min_{K_j} \sum_i^n |I_i - K_j|$$

where $m \geq n$, $I_i - K_j \geq 0$, and, for all i, $D_{max} \geq K_{j+1} - K_j \geq D_{min}$, $D_{max}$ being a maximum chunk duration, $D_{min}$ being a minimum chunk duration; and transcode the video file using the plurality of consecutive chunks.

14. The apparatus of claim 13, wherein the video file is received from an analytics extractor that generates the point of interest.

15. The apparatus of claim 13, wherein the apparatus is further configured to:
generate a manifest file associated with the video file, wherein the manifest file includes times associated with the point of interest and a plurality of keyframes.

16. The method of claim 1, further comprising:
determining a global minimum by conferring with a policy based on at least one of a bandwidth, a video quality, and a transcoding rate.

17. The method of claim 6, wherein the manifest file is used by a client device to begin a playback of the video file.

18. The method of claim 7, wherein the bounding preserves a random access that allows a client device to seek to a random part of the video file.

19. The method of claim 1, wherein the HTTP streaming is Dynamic Adaptive Streaming over HTTP.

20. The logic of claim 8, wherein the HTTP streaming is Dynamic Adaptive Streaming over HTTP.

\* \* \* \* \*